Oct. 29, 1968 J. G. KIERNAN ET AL 3,407,681
FACE GEAR AND METHOD OF ITS MANUFACTURE
Filed Jan. 12, 1967
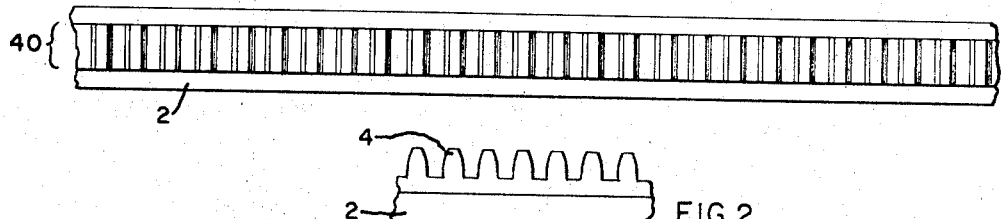
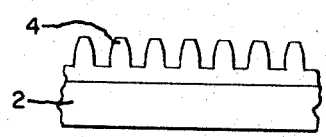
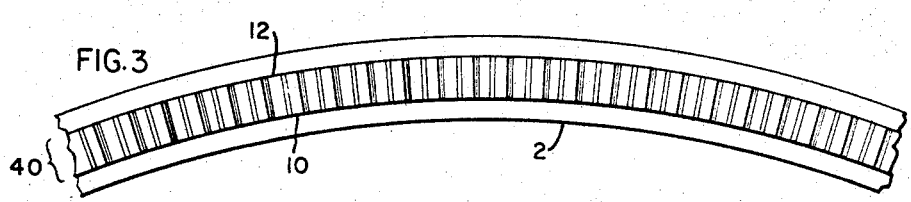
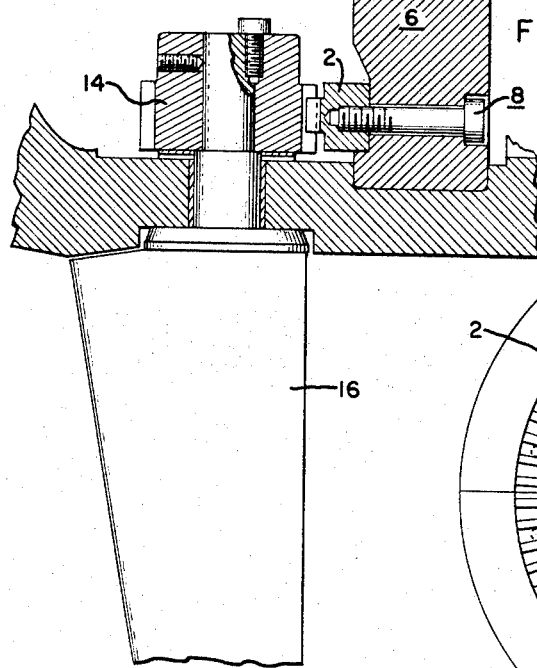
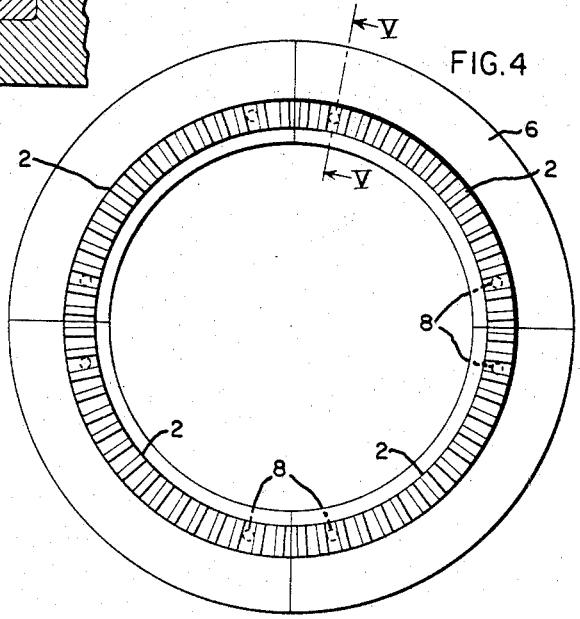
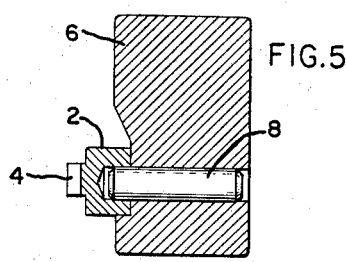
INVENTOR:
JAMES G. KIERNAN,
MARTIN O. TRABLER,
BY Robert J. Bird
THEIR ATTORNEY.

United States Patent Office 3,407,681
Patented Oct. 29, 1968

3,407,681
FACE GEAR AND METHOD OF ITS MANUFACTURE
James G. Kiernan, Albany, and Martin O. Trabler, Schenectady, N.Y., assignors to General Electric Company, a corporation of New York
Filed Jan. 12, 1967, Ser. No. 608,766
3 Claims. (Cl. 74—448)

ABSTRACT OF THE DISCLOSURE

A face gear made up of several members formed into arcs from straight rack members.

Background of the invention

The present invention relates to a face gear and the method of its manufacture.

A face gear may be considered to be a bevel gear having a pitch angle of 90°, that is, a 90° angle between the plane of the gear teeth and the axis of the gear. To put it another way, a face gear is a bevel gear having a cone angle of 180°.

Such gears are of course known to the art, and the common method of their manufacture is by machining the gear teeth from a ring member which then becomes the gear. Machining of gears is an expensive process and of course the larger the gear, the more expensive it is to machine.

It is an object of the present invention to provide a face gear produced by a method costing only a fraction of the cost of a correspondingly sized gear of the prior art.

Other objects, advantages and features of the present invention will become apparent from the following description when taken in connection with the accompanying drawing.

Summary of the invention

Briefly, the present invention includes a face gear made up of individual arcuate gear elements which are bent or curved into their arcuate configuration from straight rack workpieces. The several arcuate members are placed end to end around a 360° circumference and attached to a supporting ring to form a ring or face gear.

Drawing

In the drawing:
FIG. 1 is a top view of a toothed rack element.
FIG. 2 is a side view of the rack element of FIG. 1.
FIG. 3 is a view of the rack element of FIG. 1 and shown bent into an arcuate configuration.
FIG. 4 is an axial view of the face gear assembled according to the present invention.
FIG. 5 is a section taken along the line V—V in FIG. 4.
FIG. 6 is a sectional elevation showing a part of a turbomachine in which the present invention may be employed.

Description of the preferred embodiment

Referring now to FIGS. 1 and 2, an ordinary rack element having spur teeth 4 and known to the prior art is shown at 2. Such a rack element is the most economically and easily produced form of gear.

By means of rolls, or brakes, which are not shown but are well known in the metalworking art, the rack member 2 of FIG. 1 is bent or curved about an axis to produce the curved rack element shown in FIG. 3.

Rack elements 2, after being curved, are placed end to end around a 360° circumference as shown in FIG. 4 and are mounted or fastened to a ring member 6 by means of screws 8 or any other known fastening means. This is shown more clearly in FIG. 5.

It will be apparent that the deformation or bending of the rack member 2 about the axis perpendicular to the plane of the teeth 4 will produce a distortion in the teeth. That is, referring now to FIG. 3, the tooth spacing will be distorted slightly due to the bending. The teeth 4 will be slightly closer together at their inner ends 10 than at their outer ends 12. This tends to put a practical lower limit on the size of gear producible by this method. However, if the tooth width, shown at 40, is lessened, the rack member can be curved about a smaller radius before the distortion becomes significant. Tooth width 40 can be reduced subject only to the consideration of strength required of the gear teeth to carry their intended load. As an example, one gear made by this method has a 48″ diameter and ½″ wide teeth. Now if the teeth were made ¼″ wide, the rack could be curved around a smaller radius to form a 24″ gear having about the same degree of distortion as the 48″ gear with ½″ wide teeth.

Although initially, a pinion mating with this ring gear or face gear 2 might be in point or line contact therewith, the initial operating wear will result in surface contact between the pinion and the face gear 2 on at least the radially inward portions of teeth 4. In other words, as soon as wear takes place, there is more surface contact between pinion and face gear so that wear is correspondingly reduced.

In FIG. 6, a part of a turbomachine is shown in section which employs the face gear of the present invention mating with a pinion shown at 14 for the purpose of turning, on the pinion axis, the stator vanes 16 within such a turbomachine. In such an application, the face gear 2 is motivated by a conventional servo control for the purpose of regulating the angle of stator vane 16 which in turn provides a control of the turbomachine exhaust gas temperature, output, etc.

The economy to be realized by making the gears accordample is a 48″ diameter gear having teeth ½″ wide and in operation, controlling the angle of the stator vane 16, this gear 2 rotates only a few degrees in either direction from the normal. It will be appreciated that, for this application, great precision of these gear teeth is not essential since the wear or the method of use is not severe. The economy to be reailzed by making the gears according to the present invention is more important.

Such ring gear controls of turbomachine stator vanes are known to the prior art. However, ring gears heretofore used for such purpose have generally been bevel gears associated with bevel pinions and as such, these large bevel gears are subject to the expensive machining processes involved in their production. They therefore add substantially to the cost of the control system for their associated stator vanes.

A face gear according to this invention can be made (subject to some minimum limit) to any size desired, without a maximum limit, since the gear is composed of individual elements which can be bent around any radius It will be apparent that a face gear has herein been described which is comparatively economical to produce and can be produced in a variety of large sizes. The same method could be employed to produce large spur gears. The rack workpieces would only have to be bent about a different side.

It may occur to others of ordinary skill in the art to make modifications of the present invention which will remain within the concept and scope thereof and will not constitute a departure therefrom. Accordingly, it is intended that the invention be not limited by the details in which it has been described but that it encompass all within the purview of the following claims.

What is claimed is:
1. A method of making a gear including the steps of:

bending a plurality of straight rack members into arcuate configurations about an axis, and fastening said members to a coaxial ring member in continuous end to end array around a 360° circumference.

2. A method of making a face gear including the steps of bending a plurality of straight rack members into arcuate configurations about an axis such that the rack teeth extend from their roots in a coaxial direction, and fastening said members to a coaxial ring member in continuous end to end array around a 360° circumference.

3. A face gear comprising a supporting ring and a plurality of arcuate face gear elements mounted in continuous circumferential array relative to said ring, said face gear elements being formed from straight rack elements, the teeth of said face gear elements extending from their roots in a direction coaxial with said ring.

References Cited

UNITED STATES PATENTS

| Re. 256 | 1/1854 | Taplin | 74—448 X |
|---|---|---|---|
| 887,144 | 5/1908 | Stoffel | 74—448 |
| 2,707,884 | 5/1955 | Boisvert | 74—448 |
| 2,804,681 | 9/1957 | Brueckner | 29—159.2 |
| 2,805,818 | 9/1957 | Ferri. | |
| 2,994,509 | 8/1961 | Walker | 253—78 |
| 3,225,616 | 12/1965 | Whitehead | 74—448 X |
| 3,318,574 | 5/1967 | Tyler | 253—78 X |

FRED C. MATTERN, JR., *Primary Examiner.*

LEONARD H. GERIN, *Assistant Examiner.*